United States Patent [19]

Arvedson et al.

[11] Patent Number: 5,173,343

[45] Date of Patent: Dec. 22, 1992

[54] NARROW MOLECULAR WEIGHT DISTRIBUTION ETHYLENE-ACRYLATE CLING LAYER IN STRETCH/CLING FILMS

[75] Inventors: Marsha M. Arvedson, Houston; Patrick Brant, Seabrook; Joseph D. Domine, Humble; Paul M. German, Friendswood, all of Tex.

[73] Assignee: Exxon Chemical Patents Inc., Linden, N.J.

[21] Appl. No.: 633,509

[22] Filed: Dec. 28, 1990

Related U.S. Application Data

[63] Continuation-in-part of Ser. No. 123,002, Nov. 19, 1987, abandoned.

[51] Int. Cl.$^5$ .............................................. B65B 53/00
[52] U.S. Cl. .................. 428/34.9; 428/516; 428/520; 428/910
[58] Field of Search .............. 428/34.9, 910, 516, 428/520

[56] References Cited

U.S. PATENT DOCUMENTS

| | | | |
|---|---|---|---|
| 3,508,944 | 4/1970 | Henderson et al. | 117/7 |
| 3,748,962 | 7/1973 | Hilkert et al. | 90/4 |
| 3,817,821 | 6/1974 | Gallini | 161/165 |
| 4,022,646 | 5/1977 | Casey | 156/164 |
| 4,082,877 | 4/1978 | Shadle | 428/35 |
| 4,147,827 | 4/1979 | Breidt, Jr. et al. | 428/218 |
| 4,189,420 | 2/1980 | Sugimoto et al. | 260/31.6 |
| 4,194,039 | 3/1980 | Mueller | 428/213 |
| 4,303,710 | 12/1981 | Bullard et al. | 428/35 |
| 4,327,009 | 4/1982 | Allen et al. | 524/114 |
| 4,337,298 | 6/1982 | Karim et al. | 428/461 |
| 4,364,981 | 12/1982 | Horner et al. | 428/35 |
| 4,367,113 | 1/1983 | Karim et al. | 156/327 |
| 4,367,256 | 1/1983 | Biel | 428/218 |
| 4,399,180 | 8/1983 | Briggs et al. | 428/212 |
| 4,418,114 | 11/1983 | Briggs et al. | 428/218 |
| 4,425,268 | 1/1984 | Cooper | 524/110 |
| 4,436,788 | 3/1984 | Cooper | 428/483 |
| 4,504,434 | 3/1985 | Cooper | 264/22 |
| 4,518,654 | 5/1985 | Eichbauer et al. | 428/331 |
| 4,524,099 | 6/1985 | DiLuccio | 428/213 |
| 4,588,650 | 5/1986 | Mientus et al. | 428/516 |
| 4,833,017 | 5/1989 | Benoit | 428/323 |

FOREIGN PATENT DOCUMENTS

| | | |
|---|---|---|
| 8291930 | 7/1983 | Australia . |
| 0198091 | 10/1986 | European Pat. Off. . |
| 0287272 | 10/1988 | European Pat. Off. . |
| 0317166 | 5/1989 | European Pat. Off. . |
| 2031801 | 11/1970 | France . |
| 2123747 | 2/1984 | United Kingdom . |

Primary Examiner—Edith Buffalow
Attorney, Agent, or Firm—Myron B. Kurtzman; T. Dean Simmons

[57] ABSTRACT

A thermoplastic film is provided which is especially suited for use in stretch/cling applications such as, for example, the bundling, packaging and unitizing of foods and other goods. The film comprises a cling layer comprising a polymer of at least ethylene and 2-40 wt % acrylate having a ratio of $M_w/M_n$ less than about 3.5, a ratio of $M_z/M_w$ less than about 3, a melt index of about 0.1-30 dg/min, and a melt index swell ratio less than about 1.6, preferably without a tackifying additive. The film may further comprise a non-cling layer comprising a thermoplastic preferably essentially free of anticling (slip and/or antiblock) additive. Preferred thermoplastic materials include polyethylene and polypropylene.

34 Claims, No Drawings

NARROW MOLECULAR WEIGHT DISTRIBUTION ETHYLENE-ACRYLATE CLING LAYER IN STRETCH/CLING FILMS

CROSS-REFERENCE TO RELATED APPLICATION

This is a continuation-in-part of Ser. No. 123,002, filed Nov. 19, 1987, now abandoned copending herewith.

FIELD OF THE INVENTION

The present invention relates generally to thermoplastic ethylene-acrylate films and, more particularly, to thermoplastic ethylene-acrylate films having properties making them especially well suited for use as stretch/cling wraps in various bundling, packaging and palletizing operations.

BACKGROUND OF THE INVENTION

Stretch/cling films have found utility in a wide variety of fields including the bundling and packaging of food and other goods. One application of particular, but not limiting, interest to the present invention is in the bundling of goods for shipping and storage such as, for example, the bundling of large rolls of carpet, fabric or the like for shipping from the manufacturer to a retail outlet. An important subset of these bundling applications is in the containment and unitizing of pallet loads.

The load of a pallet may be unitized or "bundled" by stretch-wrapping a film several times around the articles to be palletized. There exist a variety of stretch-wrapping techniques, two of which are commonly employed. In one technique, the loaded pallet is placed on a rotating turntable and the end of a continuous roll of film attached to the load. As the turntable rotates, the film is continuously wrapped around the pallet and load. Tension is applied to the film roll to cause the film to stretch as it is applied.

Because the film is in a stretched condition, it is placed under considerable tension and will have a tendency to return to its original, unstretched state. This tension can cause the film to unravel from the wrapped pallet, thereby jeopardizing the integrity of the unitized load. It is desirable, therefore, that the film have cling properties to prevent unraveling of the film from the pallet.

To impart cling properties to, or improve the cling properties of, a particular film, a number of well-known tackifying additives have been utilized. Common tackifying additives include polybutenes, terpene resins, alkali metal and glycerol stearates and oleates and hydrogenated rosins and rosin esters. The cling properties of a film can also be modified by the well-known physical process referred to as corona discharge.

The use of tackifying additives, however, may not be desirable in many applications. These additives have a tendency to accumulate on the stretch wrapping apparatus often requiring additional periodic cleaning and maintenance. They also can migrate into the bundled or unitized articles resulting in damage to such articles, as well as migrating throughout a film, even a multilayer film intended to have cling on only one side, causing tackiness on both sides. In palletizing operations, this may cause the film on adjacent pallets to cling together resulting in tear, puncture or other damage to the wrap and jeopardizing the integrity of the unitized load.

For this reason, it is desirable for the film to have slip or at least non-cling properties on its "outer" side, and not to have any tackifier migration from the "inner" cling side, to prevent this interpallet cling. Slip is defined in terms of coefficient of friction. In other words, it is desirable that the "outer" side of the film have a low coefficient of friction in contact with another object, particularly another like film. As with cling, slip can be imparted to the film or improved through the use of various well-known slip and/or antiblock additives including silicas, silicates, diatomaceous earths, talcs and various lubricants. Under highly stretched conditions, however, the coefficient of friction in the films tends to increase and even the slip additives may not provide the desired slip properties.

The tension in the stretched film may also cause the film to be more susceptible to punctures and tears. It is, therefore, also desirable for the film, as a whole, to have good stretch, tensile, puncture resistance and tear resistance properties.

Additionally, thermal stability of the various film components is important for the recycling of edge trim and film scrap generated in the various film production processes.

A wide variety of thermoplastic polymers such as, for example, polyvinyl chloride, polyethylene, polypropylene and various polymers of ethylene and other comonomers, most notably vinyl acetate, have been used as stretch/cling films. These materials standing alone, however, suffer from a number of shortcomings. Most do not possess desirable cling properties without the use of tackifying additives, and even so, cannot be stretched to a great extent without a substantial decline of cling properties. Further, most cannot be stretched to a great extent without adversely affecting their slip, tensile, tear resistance and puncture resistance properties. For the particular case of ethylenevinyl acetate polymers, thermal stability becomes a problem on the reprocessing of trim and scrap.

More recently, the use of multilayer films has gained popularity. With a multilayer film, one can obtain a stretch/cling wrap having cling properties on one side and slip properties on the other side. For example, U.S. Pat. No. 4,518,654 discloses a multilayer film having an A/B construction wherein the A side has cling characteristics and the B side has slip characteristics. In the aforementioned patent, the A side is said to comprise a polyethylene or an ethylene-monoolefin polymer, preferably linear low density polyethylene (LLDPE). To provide the LLDPE with the desired cling properties, a migrating tackifying agent such as polyisobutylene (PIB) is added to the polymer. The B side is said to comprise a low density polyethylene (LDPE) with an anticling additive added to impart the desired slip properties to the LDPE. This patent is hereby incorporated by reference herein for all purposes as if fully set forth.

Other multilayer films comprising layers of the various aforementioned stretch/cling materials are disclosed in U.S. Pat. Nos. 3,508,944, 3,748,962, 3,817,821, 4,022,646, 4,082,877, 4,147,827, 4,189,420, 4,194,039, 4,303,710, 4,399,180, 4,364,981, 4,418,114, 4,425,268, 4,436,788, 4,504,434, 4,588,650 and 4,671,987; U.K. Patent Application No. 2,123,747; French Patent No. 2,031,801; and European Patent Application No. 0,198,091, all of which are also incorporated by reference herein for all purposes. These multilayer films are generally produced by one of a number of well-known coextrusion processes also disclosed in the aforementioned incorporated references.

Many of the multilayer films, however, still suffer from shortcomings possessed by their individual layers. For instance, most still require the use of tackifying additives to impart cling properties to the film. As previously mentioned, these tackifying additives have a tendency to accumulate on dispensing apparatus and may migrate through the films to the slip side. Also, films containing a tackifying additive may be prepared and used in such a manner that the tackifying additive is "picked off" and onto the slip side of the film because the slip and cling layers of the film are in intimate contact on the film roll. Others do not possess desired slip properties, particularly when in a highly stretched state. Still others do not possess a desirable combination of stretch, tensile, tear resistance, puncture resistance and thermal stability properties.

In European Patent Application No. 0,317,166 and previously mentioned U.S. Ser. No. 123,002, filed Nov. 19, 1987, there is described a stretch/cling film having a cling layer of ethylene-acrylate copolymer. The film preferably avoids the use of a tackifying additive. These applications are hereby incorporated herein by reference.

SUMMARY OF INVENTION

The present invention, therefore, provides a thermoplastic film having properties especially well suited for use as a stretch/cling wrap.

The present invention also provides a thermoplastic film having excellent cling properties, even without the use of a tackifying additive. In fact, it is desired in one embodiment of the present invention to omit the use of such tackifying additives, such that a cling layer is essentially free of tackifier.

The present invention further provides a multilayer stretch/cling film having excellent cling properties on one side and excellent slip properties on an opposite side, even in a highly stretched state.

Still further, the present invention provides a multilayer stretch/cling film which, as a whole, possesses desirable stretch, tensile strength, puncture resistance, tear resistance and thermal stability properties.

Finally, the present invention provides a process for producing such a stretch/cling film, a process for using such stretch/cling film to bundle, package or unitize an article or a plurality of articles, and an article or plurality of articles so bundled, packaged or unitized.

In accordance with the present invention, there is provided a thermoplastic film which comprises, in its overall concept, a layer comprising a cling polymer of two or more monomers, wherein a first monomer comprises ethylene and a second monomer comprises an acrylate. Such polymer shall generally be referred to as an ethylene-acrylate (or EA) polymer.

More particularly, the EA polymer comprises an acrylate content of between about 2% to about 40%, more preferably above about 10%, most preferably above about 20%, by weight based upon the weight of the EA polymer. The EA polymer preferably has a narrow molecular weight distribution and a relatively low incidence of long chain branching. The ratio of weight average molecular weight ($M_w$) to number average molecular weight ($M_n$) is preferably less than about 3.5, more preferably less than about 3, and especially less than about 2.5, while the ratio of z average molecular weight ($M_z$) to $M_w$ is preferably less than about 3, more preferably about 2.6 or less and especially about 2.1 or less. The melt index swell ratio of the EA polymer is preferably less than about 1.6, and more preferably less than about 1.5. A tackifying additive may optionally be added to the EA polymer to improve its cling, but this is not desired and is preferably omitted such that the EA polymer is essentially free of tackifying additive.

The thermoplastic film may further comprise a second cling layer opposite the first cling layer, but preferably comprises a non-cling layer, more preferably a slip layer, opposite the cling layer, the non-cling layer comprising any suitable thermoplastic material such as, for example, polyethylene (including high density, low density and linear low density polyethylenes), polypropylene, etc. Particularly preferred is polypropylene. Additionally, the non-cling side may include one or more well-known anticling (slip and/or antiblock) additives, but the non-cling layer is preferably essentially free of such anticling additives.

The thermoplastic film of the invention may be so constructed that a layer adjacent the first cling layer is a structural layer, and the second skin layer is positioned adjacent the structural layer. That is, the structural layer separates the first cling layer and the second layer. The second layer of the thermoplastic film may comprise a cling layer or a non-cling layer. In either case, the second layer may be a polyolefin. Preferably, when the second layer is a cling layer, it also comprises a polymer of 2 or more monomers, wherein a first monomer comprises ethylene and a second monomer comprises an acrylate. Where the third layer is a non-cling layer, it may include one or more of the well-known anticling (slip and/or antiblock) additives.

The structural layer of the thermoplastic films having more than 2 layers comprises about 5 to 95%, preferably at least about 50%, more preferably at least about 70-80% of the weight of the film. The structural layer may comprise a polyolefin of suitable makeup for the purpose to which the film is to be applied, such as, for example, linear low density polyethylene which is common for strength and optical properties in unitizing applications of stretch/cling films.

The thermoplastic film of the present invention may be produced utilizing any one of a number of well-known extrusion or coextrusion (in the case of multilayer films) equipment and processing conditions. In a multilayer film, the cling layer will preferably comprise from about 5% to about 95%, and the non-cling layer(s) will preferably comprise from about 95% to about 5%, of the total combined thickness of the film layers.

Thermoplastic films produced in accordance with the present invention have excellent cling properties on the cling layer and non-cling properties on the non-cling layer. Particularly, the use of tackifying additives can be avoided because of the excellent cling properties of the cling layer EA polymer. The present thermoplastic films, as a whole, additionally have desirable stretch, tensile, puncture resistance and tear resistance properties. Further, the thermoplastic compounds used for the cling and non-cling layers have excellent thermal stability, and edge trim scrap can be processed without significant loss of film performance. This combination of properties makes the thermoplastic films of the present invention especially well suited for use as stretch/cling wraps.

These and other features and advantages of the present invention will be more readily understood by those skilled in the art from reading the following detailed description.

DETAILED DESCRIPTION OF THE INVENTION

As previously indicated, the present invention provides a thermoplastic film having excellent cling, slip, stretch, tensile, tear resistance, puncture resistance and thermal stability properties, making such film especially well suited for use as a stretch/cling wrap.

The thermoplastic film, in its overall concept, comprises a cling layer which comprises a polymer of two or more monomers, wherein a first monomer comprises ethylene and a second monomer comprises an acrylate. Acrylate, in the singular, refers to both a single acrylate and combinations of different acrylates. These polymers will generally be referred to as ethylene-acrylate (or EA) polymers.

In the preferred embodiment, the EA polymer comprises an acrylate content of between about 2% to about 40%, more preferably above about 10%, most preferably above about 20%, and especially above about 24%, by weight based upon the weight of the EA polymer. The EA polymer may have a wide range of melt indexes (MI), generally between about 0.1 to about 30, more preferably between about 1 to about 15 dg/min (ASTM D-1238, Condition E).

Acrylates useful in the present invention are those of the general formula:

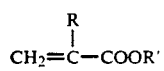

wherein R is selected from hydrogen or a hydrocarbon group having from 1 to 22 carbon atoms, preferably an alkyl, aryl, aromatic, olefin of the like hydrocarbon group and wherein R' is selected from the same or different of these hydrocarbon groups.

Preferred acrylates comprise those wherein R is selected from hydrogen or an alkyl group and wherein R' is the same or different such alkyl group. Specific examples of preferred acrylates include methyl acrylate, ethyl acrylate, propyl acrylate, n-butyl acrylate, 2-ethylhexyl acrylate, decyl acrylate, octadecyl acrylate, methyl methacrylate, ethyl methacrylate, n-butyl methacrylate and the like. Of these, methyl acrylate is particularly preferred, especially wherein the EA polymer has a methyl acrylate content above about 20%, and particularly above about 24%, by weight of the EA polymer.

As previously indicated, the EA polymer can comprise more than two monomers with at least a first monomer comprising ethylene and a second monomer comprising one or more of the above-defined acrylates. For the case of ter- or additional monomers, suitable examples include, but are not limited to, other free radically polymerizable monomers such as, for example, vinyl esters, acrylic acids (i.e. acrylic, methacrylic and ethacrylic acid), other acrylates, carbon monoxide and the like. These additional monomers will generally be present in small amounts, usually less than a total of about 10% by weight based upon the weight of the EA polymer.

The EA polymer may be produced by any one of a number of well-known processes such as, for example, those described in U.S. Pat. No. 3,350,372, which is incorporated by reference for all purposes as if fully set forth. Generally ethylene, acrylate and, if desired, another monomer(s) are metered into, for example, a high pressure autoclave reactor along with any one of a number of well-known free radical polymerization initiators (catalysts) suitable for producing EA polymers. Particularly preferred catalysts include organic peroxides such as, for example, lauroyl peroxide, di-tert butyl peroxide, tert butyl peroxide, tert butyl perpivilate and various azo compounds. Typically, the catalyst will be dissolved in a suitable organic liquid such as benzene, mineral oil, ISOPAR C hydrocarbon solvent or the like. Ordinarily the catalyst is used at a level of between about 50 to about 20,000 ppm, more preferably between about 100 to about 250 ppm based upon the weight of the monomers.

In a preferred embodiment, the EA polymer has a narrow molecular weight distribution and a reduced incidence of long chain branching which have been found to enhance the cling and optical properties of the cling layer containing the EA polymer. The narrow molecular weight distribution of the EA polymer is reflected by relatively low ratios of weight average molecular weight to number average molecular weight ($M_w/M_n$) and z average molecular weight to number average molecular weight ($M_z/M_w$). The ratio is preferably less than about 3.5, more preferably less than about 3, and especially less than about 2.5. The ratio $M_z/M_w$ is preferably less than about 3, more preferably less than about 2.6, and especially less than about 2.1. A reduction in long chain branching is generally reflected in a low melt index swell ratio, i.e., the ratio of the diameter of the melt indexer extrudate (ASTM D-1238, Condition E) to the diameter of the melt indexer orifice. The melt index swell ratio is preferably less than about 1.6 and more preferably less than about 1.5.

Films employing the preferred EA polymer as a cling layer have been found to have enhanced cling, and in particular, the cling of such films is not as adversely affected by stretching as similar films prepared from EA polymers having broader molecular weight distribution and/or more long chain branching. The film containing the EA polymer cling layer preferably has cling of the EA "inside" layer surface against the "outside" opposite layer surface (I/O cling) at 0% stretch of at least about 100 grams per inch (g), more preferably at least about 200 g, and especially at least about 250 g; and a 200% stretch I/O cling of at least about 90 g, and more preferably at least about 100 g as determined by the procedure described in the Examples hereinbelow. In addition, films prepared with the preferred EA polymer cling layer have enhanced optical properties such as, for example, less haze and more gloss, but retain comparable physical properties and processability.

Optionally, small amounts of tackifying additive may be added to the EA polymer during or after the polymerization reaction, or otherwise mixed in any manner obtaining an intimate blend therewith, to improve the cling properties of the film. A wide variety of tackifying additives are well known in the art including, for example, polybutenes, atactic polypropylenes, terpene resins, hydrogenated rosins, rosin esters and other like hydrocarbon tackifying resins. It should be noted, however, that the aforedescribed EA polymers produce films of sufficient cling so as to not require the use of a tackifying additive. For reasons previously detailed, the use of such tackifying additives is not desirable in many instances, can be avoided, and in one embodiment of the present invention, preferably is omitted such that the EA polymer is essentially free thereof.

In an alternate embodiment wherein higher cling is desired, however, the cling layer includes a relatively minor proportion of a tackifier, preferably a tackifier compatible with the EA polymer under conditions of fabrication and use. The tackifier should be selected and used in such a proportion so as to obtain a cling layer of suitable characteristics. If an insufficient or excessive proportion of the tackifier is used, the cling properties of the cling layer may not be suitably enhanced. Also, if too much tackifier is employed, the physical properties of the cling layer can be adversely affected. Generally, the upper limit on the quantity of tackifier which can be employed depends in large part on the glass transition temperature of the tackifier and its compatibility with the cling layer EA polymer. The glass transition temperature of the cling layer blend should not exceed about 0° C., and is preferably in the range of from about −20° C. to about 0° C. to avoid excessive brittleness. The proportion of tackifier used desirably should not exceed any upper compatibility limit, if any, or result in a glass transition temperature of the blend which is too high so that the cling layer is undesirably brittle. When used, the tackifier preferably comprises from about 1% to about 20%, preferably from about 5% to about 15%, by weight of the cling layer.

The tackifier may be selected from a number of well known tackifiers such as, for example, rosin and its derivatives, and various hydrocarbon resins such as polyterpenes, polydienes, poly(vinyl aromatics) and the like, provided that the tackifier is compatible with the EA polymer, i.e. miscible therewith on a molecular scale. A preferred class of compatible tackifiers includes polar tackifiers having a glass transition temperature of from about −50° C. to about 50° C., preferably from about −10° C. to about 50° C. Preferred polar tackifiers include rosin esters and hydrogenated rosin esters having an acid number from 0 to about 15 such as, for example, the methyl, glycerol, pentaerythritol and like esters of rosin and hydrogenated rosin available under the trade designations FORAL, PENTALYN, ZONESTER, SYLVATAC, STAYBELITE, PEXALYN and the like. These tackifiers typically have a Ring & Ball softening point from about 80° C. to about 105° C. FORAL 85 tackifier, a glycerol ester of hydrogenated rosin having an acid number of about 9 and a Ring & Ball softening point of about 82° C., has been found to be particularly suitable.

Another preferred class of compatible tackifiers includes amorphous polymerized hydrocarbon resins which are liquids or semisolids at 25° C., preferably having a softening point of from about 10° C. to about 25° C. Preferred amorphous hydrocarbon tackifiers include polyterpenes available under the trade designations ZONAREX, ZONAREZ and PICCOLYTE; polymerized $C_5$ diolefins available under the trade designations WINGTACK and ESCOREZ; poly(vinyl aromatics) available under the trade designations REGALREZ, NEVILLAC, PICCOLASTIC and KRISTALEX; and the like.

Specific representative examples of hydrocarbon tackifiers compatible with EMA cling polymers containing 20 weight percent methyl acrylate include ZONAREZ A25, a polymer made by Arizona Chemical from terpene hydrocarbons having a softening point of about 25° C.; REGALREZ 1018, a hydrogenated styrene-based polymer, made by Hercules, having a softening point of about 18° C.; WINGTACK 10, a polymer made by Goodyear from terpenes, having a softening point of about 10° C.; ESCOREZ 2520, a polymer made by Exxon Chemical from $C_5$ diolefins and other reactive diolefins, having a softening point of about 20° C.; and the like.

The EA polymer may, if desired, also include one or more other well-known additives such as, for example, antioxidants, ultraviolet absorbers, antistatic agents, release agents, pigments, colorants or the like; however, this should not be considered a limitation of the present invention.

The film of the present invention may further comprise a second cling layer opposite this first cling layer, but preferably further comprises a non-cling layer opposite the cling layer, with the non-cling layer preferably comprising any suitable polyolefin or combination of polyolefins such as polyethylene, polypropylene, copolymers of ethylene and propylene, and polymers obtained from ethylene and/or propylene copolymerized with minor amounts of other olefins, particularly $C_4$–$C_{12}$ olefins. Particularly preferred is polypropylene. Suitable polypropylene is normally solid and isotactic, i.e., greater than 90% hot heptane insolubles, having wide ranging melt flow rates (MFR) of from about 0.1 to about 300 dg/min. As is known, such polypropylene is normally crystalline with a density range of from about 0.89 to about 0.91 g/cc for isotactic polypropylene. Such polypropylene and methods for making the same are well-known in the art, and they are readily available commercially. Employing polypropylene in the non-cling layer has the added advantage of imparting abrasion resistance thereto.

Also suitable is linear low density polyethylene (LLDPE), i.e., a copolymer of ethylene with up to about 20% by weight $C_3$–$C_{10}$ olefin(s). Especially preferred olefins include 1-butene, 1-hexene, 1-octene and 4-methylpentene−1. Suitable LLDPEs include those having a density greater than about 0.900 g/cc, more preferably in the range of from about 0.900 to about 0.940 g/cc. The LLDPEs may also have a wide ranging MI, generally up to about 30 dg/min, preferably between about 0.5 to about 10 dg/min. Such LLDPEs and methods for making the same are well-known in the art, and they are readily available commercially.

Additionally, the non-cling layer may include one or more anticling (slip and/or antiblock) additives which may be added during the production of the polyolefin or subsequently blended in to improve the slip properties of this layer. Such additives are well-known in the art and include, for example, silicas, silicates, diatomaceous earths, talcs and various lubricants. These additives are preferably utilized in amounts ranging from about 100 ppm to about 20,000 ppm, more preferably between about 500 ppm to about 10,000 ppm by weight based upon the weight of the non-cling layer.

The non-cling layer may, if desired, also include one or more other well-known additives such as, for example, antioxidants, ultraviolet absorbers, antistatic agents, release agents, pigments, colorants or the like; however, this again should not be considered a limitation of the present invention.

Additionally, normal trim and scrap from the film production process can be recycled into either the cling or non-cling layers, but preferentially to the non-cling layer of a two-layer film or the core structural layer of a three-layer film.

The present invention may also include one or more intermediate layers between the cling and non-cling layers for any one of a number of well-known purposes such as, for example, to modify the overall physical properties balance of the film, to utilize the recycle trim and scrap or to provide a barrier layer to oxygen or other gases. As just indicated, this intermediate layer may include the recycle trim and scrap, or may comprise any other suitable polymer. The intermediate layer(s), however, is optional and should not be considered a limitation on the present invention.

In preparing the thermoplastic stretch/cling films of the present invention, any one of a number of well-known extrusion or coextrusion (in the case of multilayer films) techniques as disclosed in the previously incorporated references may be utilized. As preferred examples, any of the blown or chill roll cast processes as disclosed and described in those references is suitable for use in producing thermoplastic stretch/cling films in accordance with the present invention.

In a multilayer film, the cling layer preferably comprises between about 5% to about 95%, more preferably between about 5% to about 35%, most preferably between about 5% to about 15% of the combined thickness of the film layers. Conversely, the non-cling layer(s) (including any structural or other intermediate layer) preferably comprises between about 5% to about 95%, more preferably between about 65% to about 95%, most preferably between about 85% to about 95% of the combined thickness of the film layers.

As previously mentioned, the thermoplastic films of the present invention have properties making them especially well suited for use as stretch/cling films, however this use should not be considered a limitation on the present invention. For example, these films can be made into other forms, such as a tape, by any one of a number of well-known cutting, slitting and/or rewinding operations. Physical properties including, but not limited to, tensile strength, tear strength and elongation can be adjusted over wide ranges by altering the resin types and specifications as appropriate to meet the requirements to a given wrapping, bundling or taping application.

For bundling, packaging and unitizing applications, the thermoplastic film of the present invention is stretch-wrapped by any one of a number of well-known procedures (such as those disclosed in the aforementioned incorporated references) around an article or a plurality of articles preferably so that the cling layer faces inside (towards the article) and the non-cling layer faces outside (away from the article), although this film orientation should not be considered as a limitation on the invention. Typical of articles suitable for bundling, packaging and unitizing with the present thermoplastic film include, but are not limited to, various foodstuffs (canned or fresh), rolls of carpet, liquid containers and various like goods normally containerized and/or palletized for shipping, storage and/or display.

The foregoing more general discussion of this invention will be further exemplified by the following specific examples offered by way of illustration and not limitation of the above-described invention.

EXAMPLES

In the following examples, property evaluations were made in accordance with the following tests:

(1) Coefficient of Friction (COF)—ASTM D-1894.

(2) Cling—cling is reported as the force in grams required to partially peel apart two strips of film. A first film strip is attached to a 30° inclined plane with the outside surface (slip) facing upward. A second 1"×8" strip is placed on top of the first strip with the inside surface (cling) facing downward. Pressure is applied to the second strip to cause the two strips to stick together. If an evaluation of cling under stretched conditions is desired, both film strips are prestretched and allowed to relax before testing. The end of the second strip at the base of the inclined plane is attached, by clip and string, to an apparatus which can exert a strain at a constant rate (Instron 1130). The two strips are then pulled apart at a crosshead speed of 10 cm/min until the aforementioned string is parallel with the base of the inclined plane. The force at this point is reported as cling.

EXAMPLES 1-10

An ethylene-methyl acrylate (EMA) copolymer, with an MI of 5 dg/min, was coextruded with a LLDPE (ethylene-hexene) having a density of 0.918 g/cc and an MI of 3.2 dg/min (commercially available from Exxon Chemical Company, Houston, Tex., under the trade designation LL-3003). Slip (Kememide E, a commercial erucamide available from Humko Chemical Company, Memphis, Tennessee) and antiblock (AB) (Super Floss:x a commercial silica available from Johns Manville) were added to the LLDPE. Other properties of the EMA and LLDPE are listed below in Table I.

The film was produced by coextruding the EMA copolymer and LLDPE on a Black Clawson cast film line with two 3.5" extruders, respectively, for the EMA and LLDPE layers. The EMA was extruded at a melt temperature of 400° F., while the LLDPE was extruded at a melt temperature of 450° F. The chill roll temperature was set to 80° F. and the line speed to 450 feet per minute.

The resulting film had a gauge of 0.8 mil with the EMA layer comprising 20% of the total film thickness. The slip of the "outside" LLDPE surface against another "outside" LLDPE surface (O/O slip) was then measured as the coefficient of friction (COF) for 0%, 100% and 200% stretch, and I/O cling results are presented below in Table I.

TABLE I

| EX. | EMA LAYER % MA | LLDPE LAYER AB (ppm) | LLDPE LAYER SLIP (ppm) | COF (kinetic)[1] 0% Stretch | COF (kinetic)[1] 100% Stretch | COF (kinetic)[1] 200% Stretch | CLING (g)[2] 100% Stretch | CLING (g)[2] 200 Stretch |
|---|---|---|---|---|---|---|---|---|
| 1 | 24 | 10000 | 500 | 0.19 | 0.21 | 0.35 | 20 | 30 |
| 2 | 24 | 0 | 500 | >1 | >1 | >1 | 107 | 90 |
| 3 | 24 | 5000 | 1000 | 0.20 | 0.35 | 0.44 | 50 | 50 |
| 4 | 24 | 5000 | 0 | 0.45 | 0.83 | >1 | 90 | 85 |
| 5 | 24 | 5000 | 500 | 0.26 | 0.61 | >1 | 77 | 72 |
| 6 | 28 | 10000 | 500 | 0.23 | 0.28 | 0.42 | 77 | 65 |
| 7 | 28 | 0 | 500 | >1 | >1 | >1 | 175 | 126 |
| 8 | 28 | 5000 | 1000 | 0.21 | 0.32 | 0.51 | 83 | 75 |
| 9 | 28 | 5000 | 0 | 0.70 | >1 | >1 | 149 | 113 |

TABLE I-continued

| EX. | EMA LAYER % MA | LLDPE LAYER AB (ppm) | LLDPE LAYER SLIP (ppm) | COF (kinetic)[1] 0% Stretch | COF (kinetic)[1] 100% Stretch | COF (kinetic)[1] 200% Stretch | CLING (g)[2] 100% Stretch | CLING (g)[2] 200 Stretch |
|---|---|---|---|---|---|---|---|---|
| 10 | 28 | 5000 | 500 | 0.45 | 0.75 | >1 | 114 | 86 |

[1] LLDPE to LLDPE layer surfaces
[2] EMA to LLDPE layer surfaces

EXAMPLES 11 AND 12

A 28% MA, 3 dg/min MI, EMA copolymer was coextruded with LL-3003 as in Examples 1-10. extrusion melt temperature was 440° F. and LLDPE extrusion melt temperature was 470° F. Slip and antiblock additives were again added to the LLDPE.

The resulting film had a gauge of 0.85 mil with the EMA layer comprising 15% of the total film thickness. The O/O slip (LLDPE/LLDPE) was then measured as the coefficient of friction (COF) for 0%, 100% and 200% stretch, and I/O cling (EMA/LLDPE) was measured for 0%, 100% and 200% stretch. The results are presented below in Table II. These films were also evaluated on a commercial Lantech V-Series Power Prestretch machine at 160% and 330% stretch with the results presented in Table III.

TABLE II

| EX. | LLDPE LAYER AB (ppm) | LLDPE LAYER SLIP (ppm) | COF (kinetic)[1] 0% Stretch | COF (kinetic)[1] 100% Stretch | COF (kinetic)[1] 200% Stretch | CLING (g)[2] 0% Stretch | CLING (g)[2] 100% Stretch | CLING (g)[2] 200 Stretch |
|---|---|---|---|---|---|---|---|---|
| 11 | 5000 | 500 | 0.39 | 0.48 | 0.80 | 165 | 170 | 130 |
| 12 | 10000 | 1000 | 0.25 | 0.33 | 0.54 | 70 | 110 | 75 |

[1] LLDPE to LLDPE layer surfaces
[2] EMA to LLDPE layer surfaces

TABLE III

| EX. | SLIP[1] 160% Stretch | SLIP[1] 330% Stretch | CLING (g)[2] 160% Stretch | CLING (g)[2] 330% Stretch |
|---|---|---|---|---|
| 11 | good | fair | good | good |
| 12 | excellent | very good | very good | good |

[1] LLDPE to LLDPE layer surfaces
[2] EMA to LLDPE layer surfaces

EXAMPLE 13

A 24% MA, 5 dg/min MI, EMA copolymer was coextruded with 12 melt flow rate (ASTM D-1238, condition L) polypropylene (commercially available from Exxon Chemical Company, Houston, Tex., under the trade designation PP-3014) as in Examples 1-10. No slip and/or antiblock additives were added to the polypropylene. The EMA copolymer layer comprised about 30% of the total film thickness.

The O/O slip (polypropylene/polypropylene) was then measure as the COF, and the I/O (EMA/polypropylene) cling measured as in Examples 11 and 12. The results are presented in Table IV below.

EXAMPLE 14

At 24% MA, 5 dg/min MI, EMA copolymer was coextruded with a blend of 10 wt% PP-3014, 90 wt% LL-3003, 5000 ppm antiblock and 500 ppm slip (as in Examples 1-10). The EMA copolyMER layer comprised about 30% of the total film thickness. The O/O slip was then measured as the COF, and the I/O cling measured as in Examples 11 and 12. The results are presented in Table IV below.

TABLE IV

| EX. | PP LAYER AB (ppm) | PP LAYER SLIP (ppm) | COF (kinetic)[1] 0% Stretch | COF (kinetic)[1] 100% Stretch | COF (kinetic)[1] 200% Stretch | CLING (g)[2] 0% Stretch | CLING (g)[2] 100% Stretch | CLING (g)[2] 200 Stretch |
|---|---|---|---|---|---|---|---|---|
| 13 | 0 | 0 | 0.66 | 0.86 | >1 | 339 | 267 | 234 |
| 14 | 5000 | 500 | 0.73 | 0.90 | >1 | 179 | 164 | 128 |

[1] PP to PP layer surfaces
[2] EMA to PP layer surfaces

The results of Tables I-IV show that films in accordance with the present invention exhibited good physical properties, extrusion processability and utility appropriate for stretch/cling wrap applications. The results further demonstrate the ability to tailor film cling and slip properties and balance properties by altering variables including the EA polymer comonomer content, resin type(s) of the slip layer, slip additive content of the slip layer and antiblock additive content of the slip layer. The results of Table III further indicate that the overall performance of the films met or exceeded the desired balance of cling, slip, toughness and stretch performance required of stretch/cling wraps.

The films of the invention may also be used in surface protection applications with or without stretching. Especially at high acrylate level, viz., above about 24% methyl acrylate in the EA polymer, the films are very effective in the temporary protection of surface during manufacturing, transportation, etc. The easily coextruded films of the invention are also often less expensive than known surface protection films of, e.g., LLDPE and acrylic layers. Advantageously, the films of the invention do not leave adhesive traces on the surface to be protected and have good UV stability.

EXAMPLES 15-17

EMA polymers were prepared with different molecular weight distributions to demonstrate the effect thereof on the cling and optical properties of films prepared using the EMA polymers as a cling layer in a coextruded film. The EMA polymers were all prepared in a single-stage autoclave reactor having a diameter of 18 in., a total L/D of 6 and an effective L/D of 4, stirred with an agitator speed of approximately 1200 rpm. The reactor temperature profile was maintained by adjusting initiator (540 lbs t-butyl perpivilate in 80 gal of ISOPAR C) feed rate, and a MI target of 5 was controlled by feeding propylene as a chain transfer agent for molecular weight control to the reactor. Reactor conditions for the EMA polymers are set forth in Table V.

It is seen from the data in Table VI that the EMA polymer of Example 17 produced at the lower $\Delta T$ and lower conversion rate had a much narrower molecular weight distribution and less long chain branching than the EMA polymers of Examples 15 and 16 produced at the higher $\Delta T$ and conversion rates. This is reflected in the low ratios of $M_w/M_n$ and $M_z/M_w$ and the low melt index swell ratio of the Example 17 EMA polymer relative to those of the EMA polymers of Examples 15

TABLE V

| REACTOR CONDITION | CLING LAYER EMA RESIN FOR: | | |
|---|---|---|---|
| | EXAMPLE 15 | EXAMPLE 16 | EXAMPLE 17 |
| Reactor Feed Temperature (°F.) | 100 | 150 | 200 |
| Peak Reactor Temperature (°F.) | 380 | 380 | 365 |
| Reactor $\Delta T$ (°F.) | 280 | 230 | 165 |
| Reactor pressure (psi) | 28,000 | 28,000 | 28,000 |
| Ethylene Feed Rate (lbs/hr) | 64,000 | 64,000 | 64,000 |
| Methyl Acrylate Feed Rate (gal/hr) | 282 | 228 | 175 |
| Propylene Feed Rate (gal/hr) | 16 | 18 | 22 |
| EMA Production Rate (lbs/hr) | 8,500 | 7200 | 5500 |
| Conversion Rate (%) | 13.3 | 11.3 | 8.6 |

From Table V it is seen that a lower reactor $\Delta T$ (the difference between the inlet feed temperature and the peak reactor temperature) resulted in a lower conversion rate. Molecular weight data were determined using a Waters (brand) 150° C. Gel Permeation Chromatograph equipped with a differential refractive index detector using three Shodex (brand) AT-80M/S polystyrene gel columns in series. The chromatograph was calibrated with narrow molecular weight distribution (monodispersed) polystyrene standards and NBS Polyethylenme 1475 was run as a control and to convert the polystyrene based calibration curve to yield polyethylene molecular weight values. The carrier solvent was 1,2,4-trichlorobenzene at 145° C. containing 0.1 wt% Carbowax ® 550 polyethylene glycol (Union Carbide). The carrier flow rate was 1.0 ml/min. The polymer samples were dissolved at 0.1 wt% in the glycol-modified carrier solvent. A 0.3 ml (300 microliter) aliquot was injected into the chromatograph. The molecular weight distribution and moments (number, weight and z averages) were calculated using standard procedures known in the art. The base lines were constructed to cover the interval from about 945 +/−20 seconds elution time to about 1580 +/−20 seconds elution time. Resin properties of the resulting EMA polymers are set forth in Table VI.

and 16. At the same time, physical properties unrelated to molecular weight distribution were generally comparable.

Coextruded films were prepared from the EMA polymers of Examples 15-17 with a 12 dg/min melt flow rate (ASTM D-1238, condition L) polypropylene (commercially available from Exxon Chemical Company, Houston, Texas, under the trade designation PP-3014). No slip and/or antiblock were added to the polypropylene (PP). The film was produced by coextruding the EMA polymer and PP on a Black Clawson cast film line with two 3.5" extruders, respectively, for the EMA and PP layers. The EMA was extruded at a melt temperature of about 420° F., while the PP was extruded at a melt temperature of about 480° F. The chill roll temperature was set to 70° F. and the line speed to about 660 feet per minute. The resulting film had a gauge of 0.8 mil with the EMA layer comprising 20% of the total film thickness. The I/O cling (EMA/PP) was then measured for 0%, 100% and 200% stretch and results are presented below in Table VII. Haze (ASTM D-1003-61 gloss (ASTM D-2457-70), tensile strength, elongation and 1% secant modulus (ASTM D-882) were also determined and the results appear in Table VII.

TABLE VI

| EMA RESIN PROPERTY | CLING LAYER EMA RESIN FOR: | | |
|---|---|---|---|
| | EXAMPLE 15 | EXAMPLE 16 | EXAMPLE 17 |
| Methyl Acrylate Content (wt %) | 21.9 | 23.8 | 22.8 |
| Melting Temperature (°C.) | 73.0 | n/a | 73.5 |
| $M_w$ | 78,700 | 70,100 | 61,000 |
| $M_n$ | 21,400 | 23,400 | 24,800 |
| $M_z$ | 248,000 | 184,000 | 126,000 |
| $M_w/M_n$ | 3.67 | 3.00 | 2.46 |
| $M_z/M_w$ | 3.15 | 2.62 | 2.07 |
| Melt Index, 190° C./2.16 kg (dg/min) | 5.6 | 4.7 | 5.0 |
| Melt Index Ratio, 10 kg/2.16 kg | 39.2 | 44.2 | 44.0 |
| Melt Index Swell Ratio | 1.69 | 1.57 | 1.43 |
| Melt Strength (g) | 4.4 | 5.3 | 4.5 |
| @ Speed (ft/min) | 20 | 80 | 120 |
| Maximum Break Speed (ft/min) | 45 | 80 | 125 |

TABLE VII

| COEXTRUDED FILM PROPERTY | | EXAMPLE 15 | EXAMPLE 16 | EXAMPLE 17 |
| --- | --- | --- | --- | --- |
| Haze (%) | 0% Stretch | 3.0 | 1.0 | 0.6 |
|  | 100% Stretch | 3.8 | 1.8 | 1.0 |
|  | 200% Stretch | 3.2 | 1.5 | 0.8 |
| Gloss, 45° | | 80 | 90 | 94 |
| Average Cling (g)[1] | 0% Stretch | 155 | 255 | 250 |
|  | 100% Stretch | 95 | 160 | 200 |
|  | 200% Stretch | 70 | 95 | 110 |
| Tensile at Break | MD | 10,325 | 10,750 | 10,535 |
| (psi) | TD | 5250 | 5160 | 5480 |
| Elongation at Break | MD | 620 | 610 | 575 |
| (%) | TD | 730 | 720 | 705 |
| 1% Secant Modulus | MD | 80,900 | 85,900 | 84,500 |
| (psi) | TD | 81,000 | 83,800 | 85,500 |

[1] EMA to PP layer surfaces

From the data in Tables V–VII it is seen that a film prepared with a narrow molecular weight distribution, low melt index swell ratio EMA (Example 17) as a cling layer has improved cling and optical properties, and comparable physical and processability characteristics relative to the same film prepared with broader molecular weight distribution, higher melt index swell ratio EMA (Examples 15 and 16) as the cling layer.

Many modifications and variations besides the embodiments specifically mentioned may be made in the compositions and methods described herein without substantially departing from the concept of the present invention. Accordingly, it should be clearly understood that the form of the invention described herein is exemplary only, and is not intended as a limitation of the scope

What is claimed is:

1. A film, comprising:
   a cling polymer of two or more monomers, wherein a first monomer comprises ethylene and a second monomer comprises an acrylate, said cling polymer having an acrylate content of from about 2 to about 40 percent by weight, a melt index of from about 0.1 to about 30 dg/min, a melt index swell ratio less than about 1.6, a ratio of weight average molecular weight ($M_w$) to number average molecular weight ($M_n$) less than about 3.5 and a ratio of z average molecular weight ($M_z$) to $M_w$ less than about 3.0.

2. The film of claim wherein said film is a stretch/wrap thermoplastic film having a 0% stretch I/O cling of at least about 100 g comprising:
   a cling layer of said cling polymer; and
   a second layer opposite said cling layer.

3. The film of claim 1, wherein said cling polymer is essentially free of a tackifying additive.

4. The film of claim 1, wherein said cling polymer includes a compatible tackifier blended therewith.

5. The film of claim 1, wherein said acrylate monomer comprises above about 10 percent by weight of said cling polymer.

6. The film of claim 1, wherein said acrylate monomer comprises above about 20 percent by weight of said cling polymer.

7. The film of claim 1, wherein said acrylate monomer comprises above about 24 percent by weight of said cling polymer.

8. The film of claim 1, wherein said cling polymer has a melt index from about 1 to about 15 dg/min.

9. The film of claim 1, wherein said cling polymer has a ratio of $M_w/M_n$ less than about 3.

10. The film of claim 1, wherein said cling polymer has a ratio of $M_w/M_n$ of about 2.5 or less.

11. The film of claim 1, wherein said cling polymer has a ratio of $M_z/M_w$ about 2.6 or less.

12. The film of claim 1, wherein said cling polymer has a ratio of $M_z/M_w$ about 2.1 or less.

13. The film of claim 1, wherein said melt index swell ratio is less than about 1.5.

14. The film of claim 1, wherein said acrylate monomer comprises a compound of the formula:

$$CH_2=\overset{R}{\underset{|}{C}}-COOR'$$

wherein R is selected from hydrogen or a hydrocarbon group having from 1 to about 22 carbon atoms and wherein R' is independently selected from a hydrocarbon group having from 1 to about 22 carbon atoms.

15. The film of claim 1, wherein said acrylate is selected from the group consisting of methyl acrylate, ethyl acrylate, n-butyl acrylate and 2-ethylhexyl acrylate.

16. The film of claim 1, wherein said acrylate comprises methyl acrylate.

17. The film of claim 2, wherein said second layer comprises a non-cling layer.

18. The film of claim 17, further comprising a structural layer between said cling and non-cling layers.

19. The film of claim 18, wherein said structural layer comprises at least about 50 percent by weight of said film.

20. The film of claim 17, wherein said non-cling layer is a slip layer comprising isotactic polypropylene having greater than 90% hot heptane insolubles and a melt flow rate of from about 0.1 to about 300 dg/min.

21. The film of claim 17, wherein said non-cling layer is a slip layer comprising linear low density polyethylene having a density from about 0.900 to about 0.940 g/cc and a melt index between about 0.5 to about 10 dg/min.

22. The film of claim 2, wherein said I/O cling is at least about 250 g.

23. The film of claim 1, wherein said film is a stretch/wrap thermoplastic film comprising:
   first and second opposite cling layers of said cling polymer having a 0% stretch I/O cling of at least about 100 g.

24. The film of claim 23, further comprising a structural layer disposed between said opposite cling layers.

25. A stretch/wrap thermoplastic film, comprising:

a cling layer of ethylene-methyl acrylate copolymer having an acrylate content of from about 20 to about 40 percent by weight, a melt index of from about 1 to about 15 dg/min, a melt index swell ratio less than about 1.6, a ratio of weight average molecular weight ($M_w$) to number average molecular weight ($M_n$) less than about 3.5 and a ratio of z average molecular weight ($M_z$) to $M_w$ less than about 3.0; and a non-cling layer opposite said cling layer;

wherein the film has a 0% stretch I/O cling of said cling layer surface against said non-cling layer surface of at least about 250 g.

26. The film of claim 25, wherein said non-cling layer comprises linear low density polyethylene.

27. The film of claim 25, wherein said non-cling layer comprises high density polyethylene.

28. The film of claim 25, wherein said non-cling layer comprises polypropylene.

29. The film of claim 25, wherein said non-cling layer comprises a blend of polyethylene and polypropylene.

30. A process for producing a thermoplastic film having a cling layer opposite a second layer, comprising the step of:

coextruding a first polymer having cling properties with a second polymer, said first polymer comprising two or more monomers, wherein a first monomer comprises ethylene and a second monomer comprises an acrylate, said first polymer having an acrylate content of from about 2 to about 40 percent by weight, a melt index of from about 0.5 to about 30 dg/min, a melt index swell ratio less than about 1.6, a ratio of weight average molecular weight ($M_w$) to number average molecular weight ($M_n$) less than about 3.5, a ratio of z average molecular weight ($M_z$) to $M_w$ less than about 3.0 and a 0% stretch I/O cling of at least about 100 g/in., and said second polymer comprises a thermoplastic.

31. The process of claim 30, wherein the second layer includes a structural layer and said coextruding step includes the coextrusion of said structural layer between opposite layers of said first and second polymers.

32. A method for bundling, packaging or unitizing an article or a plurality of articles, comprising the step stretch-wrapping the film of claim 1 around the article or articles.

33. A bundled, package or unitized article or plurality of articles, comprising:

the article or plurality of articles having the film of claim 1 stretch-wrapped around said article or plurality of articles.

34. A method for the surface protection of an article, comprising the step of:

covering the surface to be protected on the article with the film of claim 1.

* * * * *